United States Patent [19]

McLaughlin et al.

[11] Patent Number: 5,202,822
[45] Date of Patent: Apr. 13, 1993

[54] UNIVERSAL SCHEME OF INPUT/OUTPUT REDUNDANCY IN A PROCESS CONTROL SYSTEM

[75] Inventors: Paul F. McLaughlin, Hatfield; Robert W. Bristow, Hatboro, both of Pa.

[73] Assignee: Honeywell Inc., Minneapolis, Minn.

[21] Appl. No.: 588,386

[22] Filed: Sep. 26, 1990

[51] Int. Cl.⁵ .............................................. G05B 9/02
[52] U.S. Cl. .................................... 364/187; 371/9.1
[58] Field of Search ............... 364/132, 133, 184, 187, 364/268 MS-269.3 MS; 371/8.1, 9.1

[56] References Cited

U.S. PATENT DOCUMENTS

| | | | |
|---|---|---|---|
| 4,141,066 | 2/1979 | Keiles | 364/187 |
| 4,466,098 | 8/1984 | Southard | 379/279 |
| 4,941,087 | 7/1990 | Kap | 364/187 |
| 4,958,270 | 9/1990 | McLaughlin et al. | 364/187 |
| 4,959,768 | 9/1990 | Gerhart | 364/187 |
| 4,984,240 | 1/1991 | Keren-Zvi et al. | 364/187 |
| 5,136,498 | 8/1992 | McLaughlin et al. | 364/187 |
| 5,142,470 | 8/1992 | Bristow et al. | 364/187 |

Primary Examiner—Joseph Ruggiero
Assistant Examiner—Jim Trammell
Attorney, Agent, or Firm—Arthur A. Sapelli; William Udseth; A. Medved

[57] ABSTRACT

A controller of a control system, which operates as a master, has a slave input/output processor (IOP) connected thereto which communicates with at least one device of a predetermined type, and a backup slave IOP connected thereto of the same type as the slave IOP, the slave IOP operating as a primary IOP to the device. A method for providing backup to the slave IOP by the backup slave IOP comprises the steps of loading the backup slave IOP with the same data base as the slave IOP. The backup slave IOP eavesdrops on all communications from the controller to the slave IOP. When a write command is communicated to the slave IOP, the backup slave IOP taps the data from the bus and updates its data base. If the command is not a write command, ignores the communication. When a fault is detected by either the slave IOP or the backup slave IOP, the detection of the fault is communicated to the other IOP. The IOPs then failover such that the backup IOP is operatively connected to the device and the slave IOP is disconnected from the device. Finally, the controller acknowledges that the backup slave IOP is now operating as the primary source to the device.

10 Claims, 6 Drawing Sheets ously, there is no period of time in which an outage occurs.

UNIVERSAL SCHEME OF INPUT/OUTPUT REDUNDANCY IN A PROCESS CONTROL SYSTEM

RELATED PATENT APPLICATIONS

The present application is related to U.S. patent application, Ser. No. 07/588,387, entitled "Fault Detection in Relay Drive Circuits", by K. T. Kummer et. al., filed on even date herewith, and assigned to Honeywell Inc., the assignee of the present application.

BACKGROUND OF THE INVENTION

This invention relates to a method for implementing redundancy, and more particularly, to a method for implementing 1:1 I/O redundancy of a slave processor.

Process Control Systems with backup process controllers such as described and claimed in U.S. Pat. No. 4,133,027, issued to J. A. Hogan on Jan. 2, 1979, and U.S Pat. No. 4,141,066, issued to Y. Keiles on Feb. 20, 1979, include a backup controller having a dedicated Random Access Memory (RAM) and a dedicated Read-Only Memory (ROM). The back-up controller is essentially idle or can be doing some background tasks, but not tasks relating directly to the process control function. Upon detection of a failure of one of the primary process controllers, the data stored in the RAM of the failed controller must be transferred to the RAM of the backup controller to perform the operations of the primary controller. These systems describe a 1:N redundancy system.

Existing systems, such as that described in U.S. patent application, Ser. No. 07/299,859, filed on Jan. 23, 1989, and assigned to Honeywell Inc., the assignee of the present application, now U.S. Pat. No. 4,958,270, provide for a 1:1 redundancy system, whereby the data base of a secondary device (i.e., secondary or backup controller) is updated periodically such that the updating process is transparent to the primary functions and does not tie-up (or penalize) CPU or processor performance and utilizes a minimum amount of time. When a failover condition occurs, there is a period of time when no communications can take place (i.e., an outage) between the primary controller and the remainder of the system. Further, the primary and secondary controllers are in a predefined location, and the software utilized for implementing this redundancy feature (i.e., redundancy software) is not transparent to other layers of software above the redundancy software. For example, if a Universal Station of a plant control network were to interrogate a controller (i.e., a primary controller since the secondary controller cannot be interrogated), of a process controller of a process control system, for a value, during failover the controller is unable to respond and the universal station outputs question marks on the display to the operator.

The present invention provides a method of 1:1 redundancy for any type of slave processor in a master-slave relationship consisting of a master node and a group of user definable slave processors for a set of slave-type processors, in which the redundancy software is transparent to all other software layers above the redundancy software, and in which the failover is essentially simultane

SUMMARY OF THE INVENTION

Therefore, there is provided by the present invention, a method for providing a redundancy scheme for slave processors. A control system includes a control network for controlling a process and interfaces with a controller. The controller, which operates as a master, has a slave input/output processor (IOP) connected thereto which communicates with at least one device of a predetermined type, the types including analog input, analog output, digital input, and digital output. The controller also has a backup slave IOP connected thereto of the same type as the slave IOP. The slave IOP is operatively connected to the device and operates as a primary IOP to the device. A method for providing backup to the slave IOP by the backup slave IOP comprises the steps of loading the backup slave IOP with the same data base as the slave IOP. The backup slave IOP eavesdrops on all communications from the controller to the slave IOP. When a write command is communicated to the slave IOP, the backup slave IOP taps the data from the bus and updates its data base thereby insuring the data base of the backup slave IOP is the same as the slave IOP. If the command is not a write command, the backup slave IOP ignores the communication. When a fault is detected by either the slave IOP or the backup slave IOP, the detection of the fault is communicated to the other IOP. The IOPs then failover such that the backup slave IOP is operatively connected to the device and the slave IOP is disconnected from the device. Finally, the controller acknowledges that the backup slave IOP has become the primary source to the device. The switching of the primary IOP from the slave IOP to the backup slave IOP occurs without any loss of communications within the control system and is transparent to the control system as well as any other interrogating device.

Accordingly, it is an object of the present invention to provide a method for implementing 1:1 redundancy for any type of slave processor in a master-slave relationship.

It is another object of the present invention to provide a method for implementing 1:1 redundancy which can accommodate any number and any mix of slave processors.

It is still another object of the present invention to provide a method for implementing 1:1 redundancy in which physical location between the slave processor and the corresponding backup slave processor is selectable.

It is yet another object of the present invention to provide a method for implementing 1:1 redundancy whereby the redundancy of the slave processor and the backup slave processor is transparent to all software layers above the redundancy software layer.

It is a further object of the present invention to provide a method for implementing 1:1 redundancy whereby no communication outages occur in affecting a failover between the slave processor and the backup slave processor.

These and other objects of the present invention will become more apparent when taken in conjunction with the following description and attached drawings, wherein like characters indicate like parts, and which drawings form a part of the present application.

DETAILED DESCRIPTION

Figure 1:
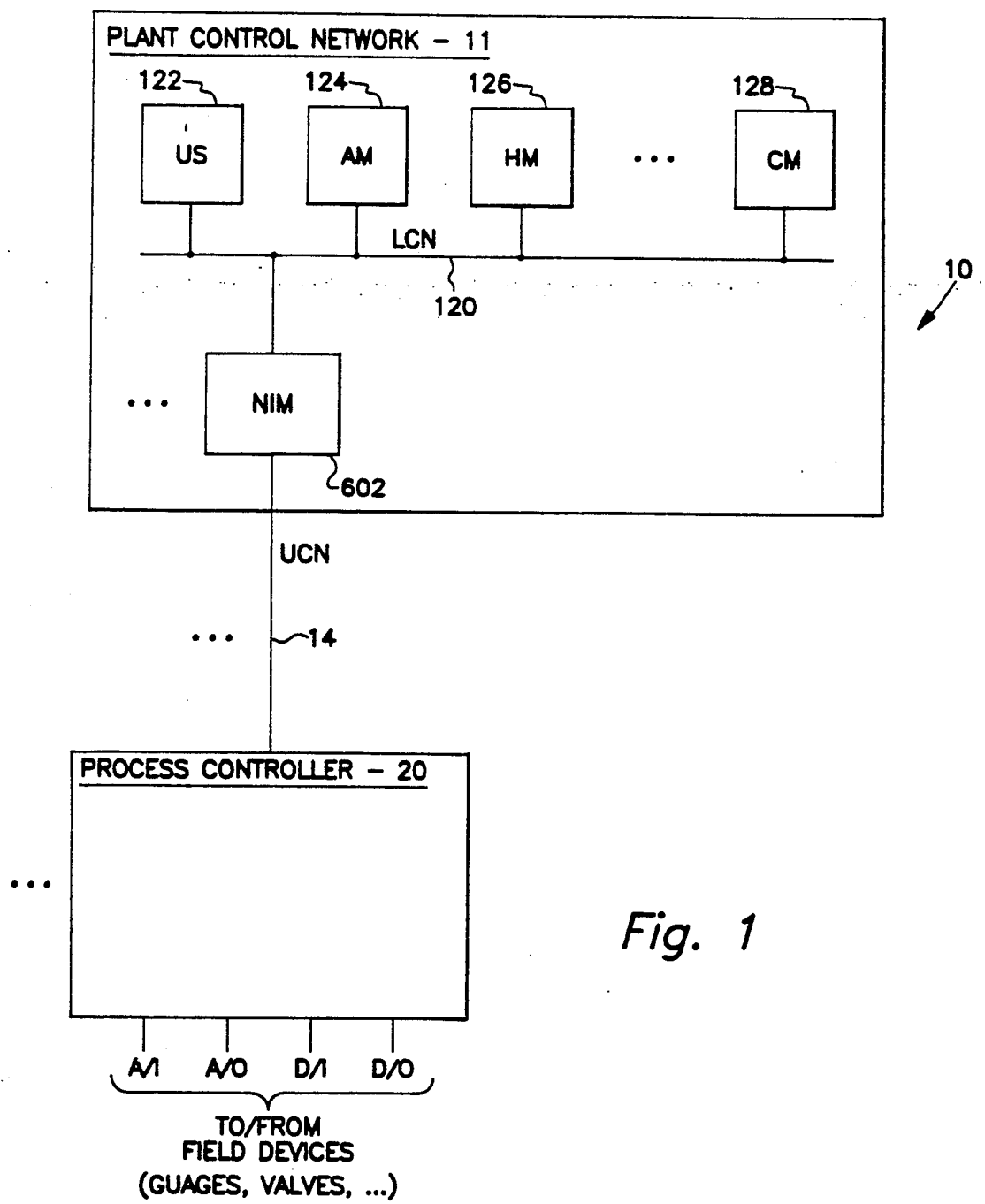
FIG. 1 shows a block diagram of a process control system in which the present invention can be utilized.

Before describing the method of the present invention, it will be helpful in understanding a system environment in which the present invention can be utilized. Referring to FIG. 1, there is shown a block diagram of a process control system 10 in which the present invention can be found. The process control system 10 includes a plant control network 11, in which a process controller 20 is operatively connected to the plant control network 11 via a universal control network (UCN) 14 to a network interface module (NIM) 602. In the preferred embodiment of the process control system 10, additional process controllers 20 can be operatively connected to the plant control network 11 via a corresponding UCN 14 and a corresponding NIM 602. The process controller 20, interfaces analog input and output signals, and digital input and output signals (A/I, A/O, D/I, and D/O, respectively) to the process control system 10 from the variety of field devices (not shown) which include valves, pressure switches, pressure gauges, thermocouples, . . . .

The plant control network 11 provides the overall supervision of a controlled process, in conjunction with the plant operator, and obtains all the information needed to perform the supervisory function, and includes an interface with the operator. The plant control network 11 includes a plurality of physical modules, which include a universal operator station (US) 122, an application module (AM) 124, a history module (HM) 126, a computer module (CM) 128, and duplicates of these modules (and additional types of modules, not shown) as necessary to perform the required control/supervisory function of the process being controlled. Each of these physical modules is operatively connected to a local control network (LCN) 120 which permits each of these modules to communicate with each other as necessary. The NIM 602 provides an interface between the LCN 120 and the UCN 14. A more complete description of the plant control network 11, and the physical modules can be had by reference to U.S. Pat. No. 4,607,256.

Figure 2:
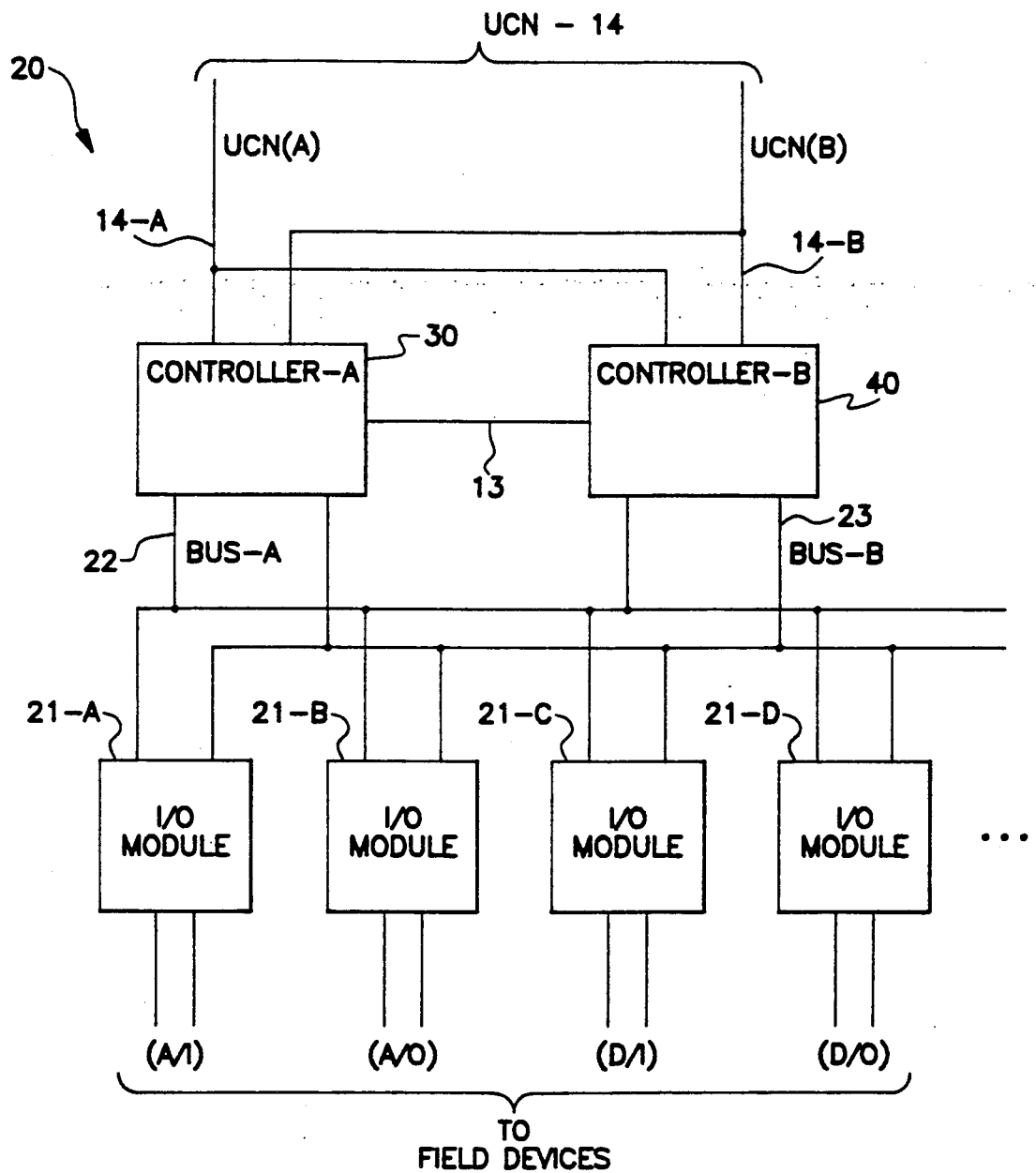
FIG. 2 shows a block diagram of a process controller, including I/O modules (IOP), in which the present invention can be utilized.

Referring to FIG. 2 there is shown a block diagram of the process controller 20. The process controller 20 of the preferred embodiment of the process control system 10 includes a controller A 30 and a controller B 40, which effectively operate as a primary and secondary controller. Controller A 30 and controller B 40 are connected to the UCN 14, the UCN 14 in the preferred embodiment, comprising for communication redundancy purposes, a UCN(A) 14A and a UCN(B) 14B. Input/output processors (IOPs) (sometimes referred to herein as input output (I/O) modules) 21 interface to field devices, field devices being various valves, pressure switches, pressure gauges, thermocouples, . . . which can be analog inputs (A/I), analog outputs (A/O), digital inputs (D/I), and digital outputs (D/O). The controller A 30 interfaces to each I/O module 21 via a bus A 22, and controller B 40 interfaces to each I/O module 21 via a bus B 23. In addition, once again for communication redundancy purposes, controller A 30 is also connected to bus B 23 and controller B 4 is connected to bus A 22.

Controller A and controller B, 30, 40, can communicate with each other via three mediums, the UCN 14, a link 13 between the controllers, and the buses A, B, 22, 23, with bus A and bus B in the preferred embodiment being serial I/O links. One controller (controller A 30 or controller B 40) operates as a primary controller and the other controller operates as a secondary controller (in more of a reserve mode than a back-up, in that if a failure of controller A 30 should occur, controller B is ready to take over the control function with essentially no start-up or initialization time). On a predetermined time basis, point processing is performed by the controller designated as the primary controller and communicates with the I/O modules 21. In addition, the controller acting as the primary controller communicates with the plant control network 11 reporting status, history, and accepting inputs from the plant control network such as commands from the operator via the universal station 122. In addition, a data base maintained by the primary controller is communicated to the secondary controller via link 13. As mentioned above, one controller operates as a secondary controller; however, it will be understood by those skilled in the art that a secondary controller is not necessary for the process controller 20.

Figure 3:
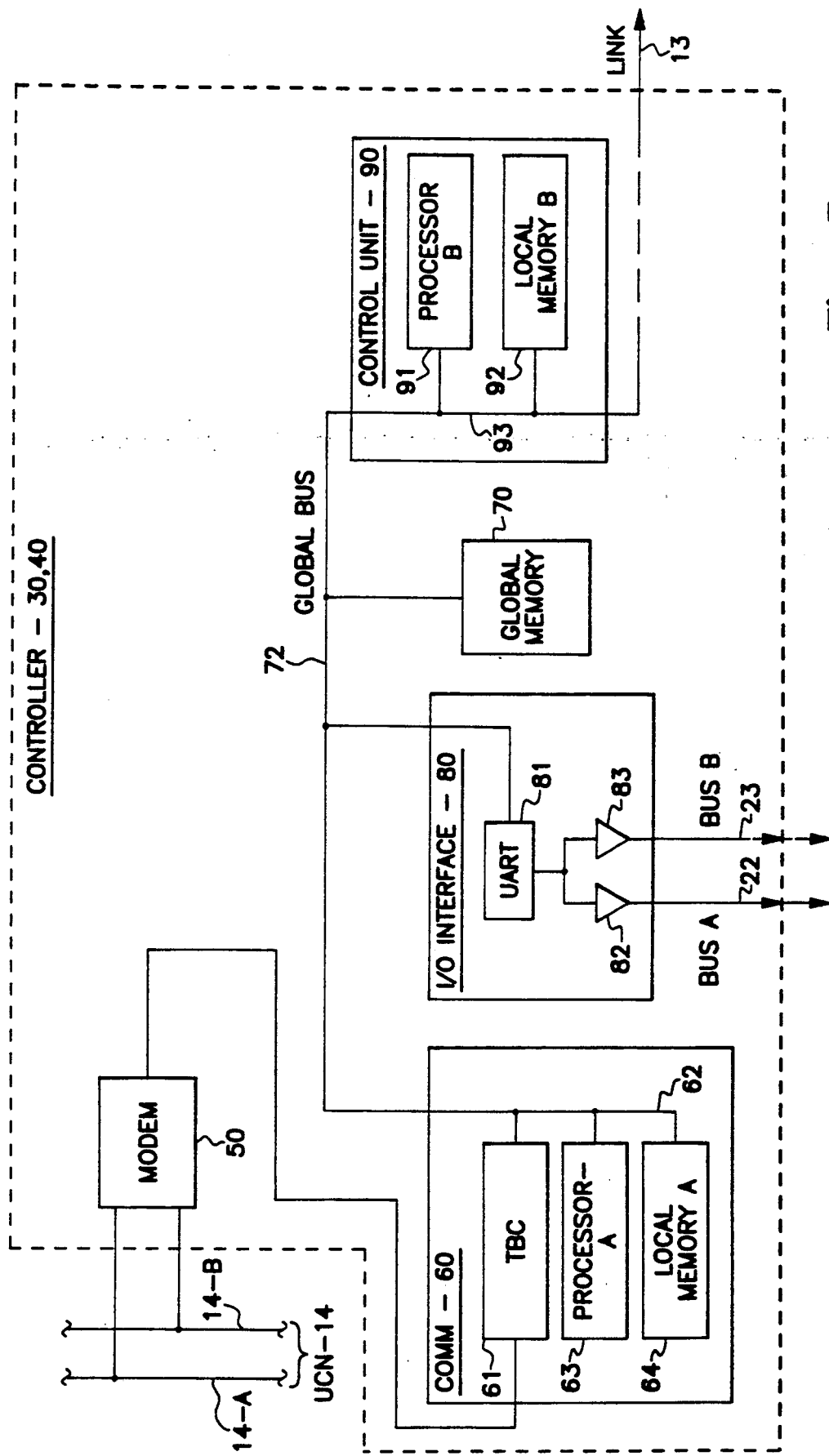
FIG. 3 shows a block diagram of a controller which is included in the process controller of FIG. 2.

Referring to FIG. 3, there is shown a block diagram of the controller 30, 40. A modem 50 is connected to the UCN 14, the modem having two inputs, one connected to UCN 14A and the other connected UCN 14B. The modem 50 interfaces with a communication unit (COMM) 60 which in turn interfaces with a global memory 70, an I/O interface unit 80, and a control unit 90 via global bus 72. The communication unit 60 includes a communication control unit, in the preferred embodiment a token bus controller (TBC) 61, Motorola type 68824, which is connected to a local bus 62. A processor A 63 (which essentially performs the communication function) is connected to the local bus 62, and a local memory A 64, which is also connected to the local bus 62. The processor A 63 communicates with the plant control network 11 via modem 50 and TBC 61. The local memory A 64 stores information, including personality image which is downloaded from the plant control network 11, for use by processor A 63 and TBC 61. The global memory 70 stores information which is common to both processor A 63 and a processor B 91. It also stores all the data received from bus A 22 and bus B 23. The global memory 70 also serves as an interprocessor communication vehicle between the processors A 63 and B 91. Control unit 90 includes the processor B 91 and a local memory B 92, both connected to a local bus 93. Processor B 91 performs the control function (i.e., control processing) relating to the field devices. This essentially includes performing the point processing, and updating the local memory B 92 and global memory 70. Also coupled to the local bus 93 of control unit 90 is a track unit (not shown) which is utilized to implement the data base transfer via link 13 to the other controller 30, 40 of the process controller 20. A more detailed description of the track unit can be had by making reference to patent applications:

(a) patent application Ser. No. 07/299,857, entitled "APPARATUS FOR TRACKING PREDETERMINED DATA FOR UPDATING A SECONDARY DATA BASE," by P. Gerhart, filed on Jan. 23, 1989, now U.S. Pat. No. 4,959,768; and (b) patent application Ser. No. 07/299,859, entitled "METHOD FOR CONTROL DATA BASE UPDATING OF A REDUNDANT PROCESSOR IN A PROCESS CONTROL SYSTEM," by P. McLaughlin et al, filed on Jan. 23, 1989, now U.S. Pat. No. 4,958,270;

both of the above-identified applications assigned to Honeywell Inc., the assignee of the present application. The I/O interface unit 80 includes a receiver-transmitter device, this device being a UART (Universal Asynchronous Receiver/Transmitter) 81. The UART 81 is coupled through drivers 82, 83 to bus A 22 and bus B 23, respectively.

Processor B 91 receives data from the various field devices through global memory 70, performs the necessary point processing and control function, and then updates the local memory B 92 and global memory 70, as required. The communication unit 60, in response to commands from the control unit 90 via global memory 70, inputs and outputs data between the I/O modules 21 (via the I/O interface unit 80) and the global memory 70, thereby relieving the control unit 90 from the burden of I/O module management. In this manner the control processing is performed by the control unit 90 within the process controller 20 for the predefined attached field devices, and the communication (i.e., the I/O control) is handled by the communication unit 60 through the UART 81.

Figure 4:
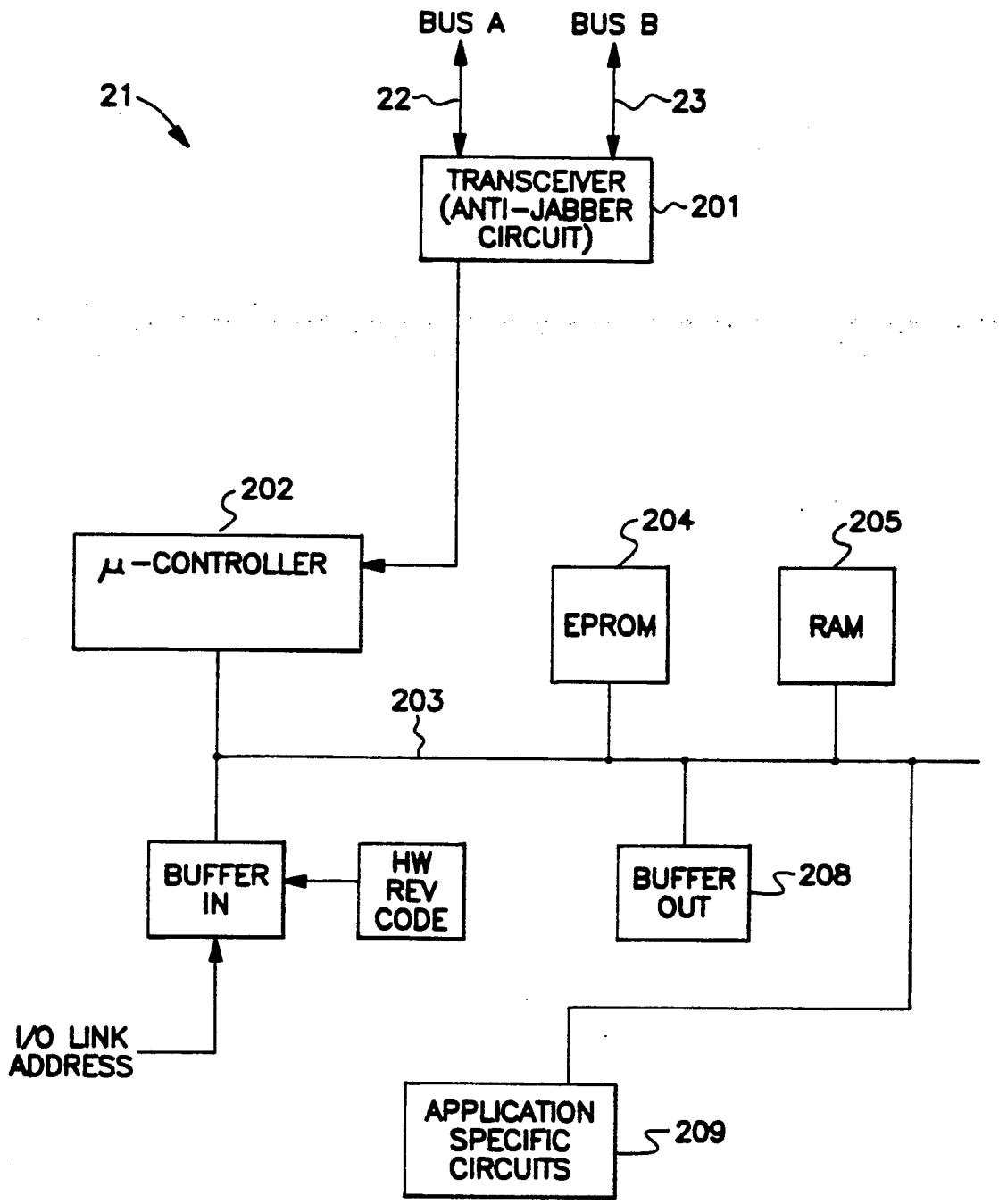
FIG. 4 shows a block diagram of an I/O module which is included in the process controller of FIG. 2.

Referring to FIG. 4 there is shown a block diagram of an I/O module. A transceiver (anti-jabber circuit) 201 interfaces with bus A 22 and bus B 23. The transceiver 201 interfaces with a microcontroller (u-controller) 202 which, in the preferred embodiment, is of the type, Intel 80C31. The microcontroller is coupled to a local bus 203, and includes an EPROM 204 and a RAM 205 also connected to the local bus 203. The RAM 205 contains the information which forms the database for the I/O module 21. The EPROM 204 contains the program information utilized by the microcontroller 202 Also attached to local bus 203 is an input buffer which receives the I/O link address information from the I/O link (bus A, bus B, 22, 23). The output buffer (BUFFER OUT) 208 is connected to the local bus 203. The application specific circuits 209 are also connected to the local bus 203 and interfaces with the input and output buffers 206, 208, and the microcontroller 202 via the local bus 203. The application specific circuits 209 vary from I/O module to I/O module depending on the field device to which the I/O module is to be coupled. If the field device is of a type which requires a digital input, then the application specific circuit 209 will include the logic in order to place the digital input into a predefined format which will interface with the remainder of the I/O module. Likewise, if the field device is such that requires an analog input, then the application specific circuit contains logic which converts the analog input signal (via an A/D converter) into a format again consistent with predefined formats. In this manner, the I/O modules are referred to as a specific I/O module type.

The microcontroller 202 performs the I/O processing (or preprocessing) for the application specific circuits 209. The preprocessing will vary from each I/O module 21 depending on the type (i.e., A/I, A/0, . . . ) the preprocessing essentially consisting of translating the signals from the application specific circuits to a format compatible with the controller 30, 40, and putting the signals from controller 30, 40 in a format compatible with the I/O module 21. Some of the preprocessing performed includes zero drift, linearization (linearizing thermocouples), hardware correction, compensation (gain compensation and zero compensation), reference junction compensation, calibration correction, conversions, checking for alarms (limits) . . . and generating a signal in a predetermined format having predetermined scale (i.e., engineering units, normalized units, percent of scale, . . . ). In the preferred embodiment seven types of applications specific circuits are provided for, these include a high level analog input, low level analog input, analog output, digital input, digital output, smart transmitter interface, and pulse input counter.

Figure 5:
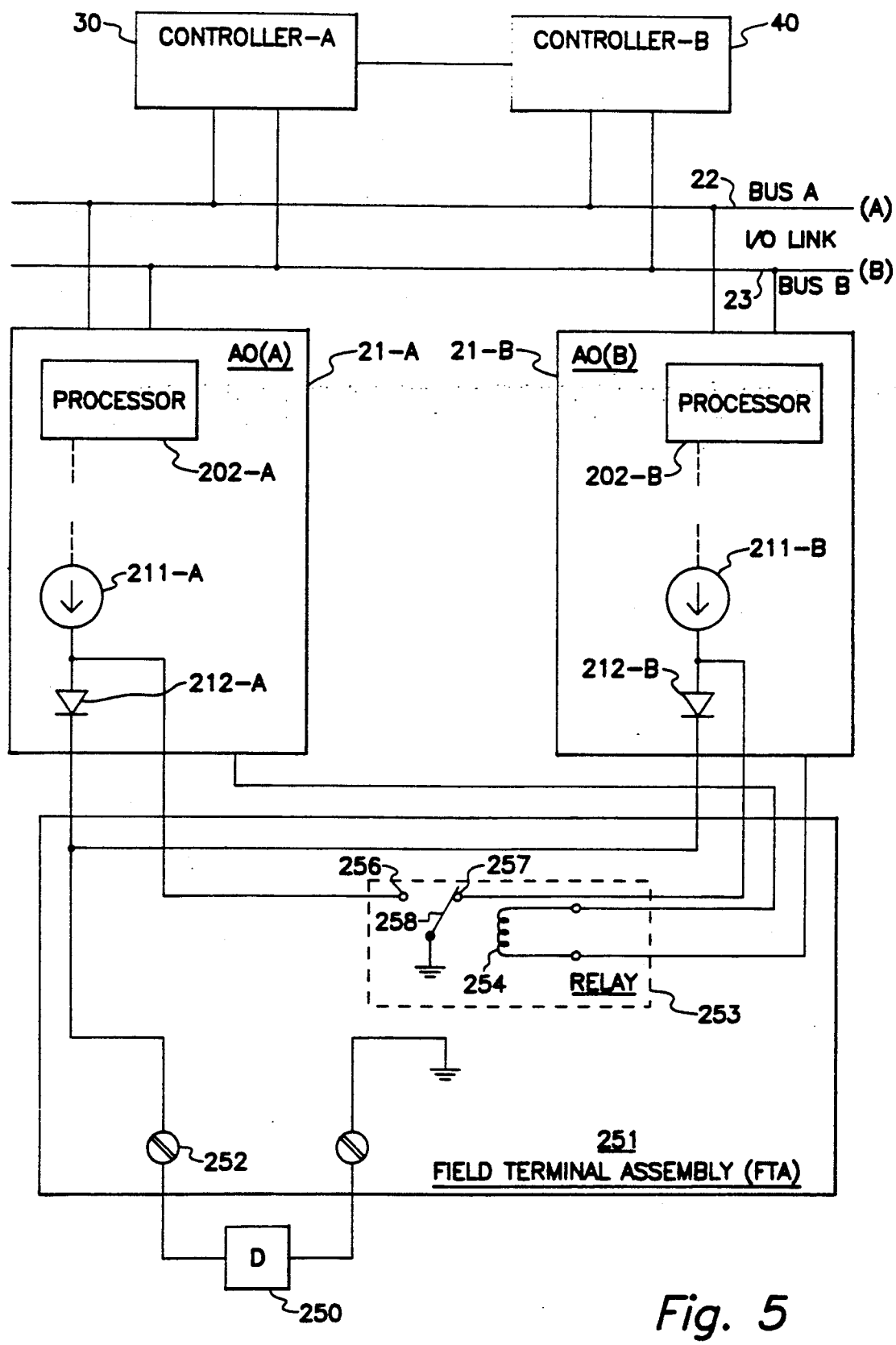
FIG. 5 shows a block diagram of the redundancy scheme of the present invention.

Referring to FIG. 5, there is shown a functional block diagram of a field terminal assembly (FTA) 251 utilized to implement the redundancy scheme of the present invention. As described above, the process controller 20 includes controller A 30 and controller B 40 connected to the I/O link 22, 23. Also connected to the I/O link 22, 23 are the I/O modules 21 (also referred to herein as input/output processor IOP). In a redundancy scheme of the preferred embodiment of the present invention, the analog output type I/O module 21 is duplicated, shown in FIG. 5 as AO(A) 21-A and AO(B) 21-B. (Other I/O modules are connected to the I/O link 22, 23 as discussed above, but are not shown here for simplicity and in order to focus on the redundancy feature of the present invention.) Each IOP includes a processor 202-A, 202-B, as described above. IOP AO(A) and IOP AO(B) are both connected to a field device (D) 250, through a field terminal assembly (FTA) 251, the field device being a valve, thermocouple, . . . . Both IOPs, AO(A) 21-A and AO(B) 21-B are performing the same tasks and outputting the same information (presuming no errors in either IOP) to the FTA 251. However, the output from only one IOP is actually coupled to the field device 250, as will now be discussed.

In the preferred embodiment of the present invention, one IOP is designated the main or primary IOP and the other is designated the backup or redundant IOP. Here, IOP AO(A) 21-A is designated the main IOP interfacing with field device 250, and IOP AO(B) 21-B is designated the redundant IOP. Both IOPs are outputting the same information from a corresponding current source 211-A, 211-B. The output information is coupled to a common point 252 (a terminal sometimes referred to as the customer screw), through a corresponding diode 212-A, 212-B. A common point between the current source 211-A and diode 212-A of AO(A) 21-A is coupled to a first contact point 256 of a relay 253 and a common point between current source 211-B and diode 212-B of AO(B) 21-B is coupled to a second contact point 257 of relay 253. The arm 258 of relay 253 is connected to a ground point and is also normally switched (i.e. no current through the coil 254), to the second contact point of the relay 253, such that the output of the second current source 211-B of AO(B) 21-B is shorted to ground. In this manner only the output information from AO(A) 21-A is coupled to the field device 250. In the event of a failure of AO(A)

21-A, the relay 253 switches such that the output from AO(A) 21-A is shorted to ground and the output from the redundant IOP AO(B) 21-B is immediately coupled to the customer screw 252, and thus to the field device 250. The switching of relay 253 is initiated by activating a coil 254 of relay 253.

One terminal of relay coil 254 is connected to AO(A) 21-A and the other terminal of relay coil 254 is connected to AO(B) 21-B. Normally, the relay is switched (no current through coil 254) such that IOP(A) is communicating with the field device 250 and IOP(B) is in the backup mode (i.e., the IOP(B) output is shorted to ground by the relay 253.) When an error is detected by the controller 30, the controller A 30 (or controller B 40 if it is functioning as the primary controller) initiates a command to the IOPs to switch the relay 253. (The IOPs, IOP(A) and IOP(B) can also affect the switch over if they detect an error, as will be described hereinunder.) IOP A can output a positive current, IOP B can output a negative current, or both, to cause the relay 253 to switch.

Figure 6:
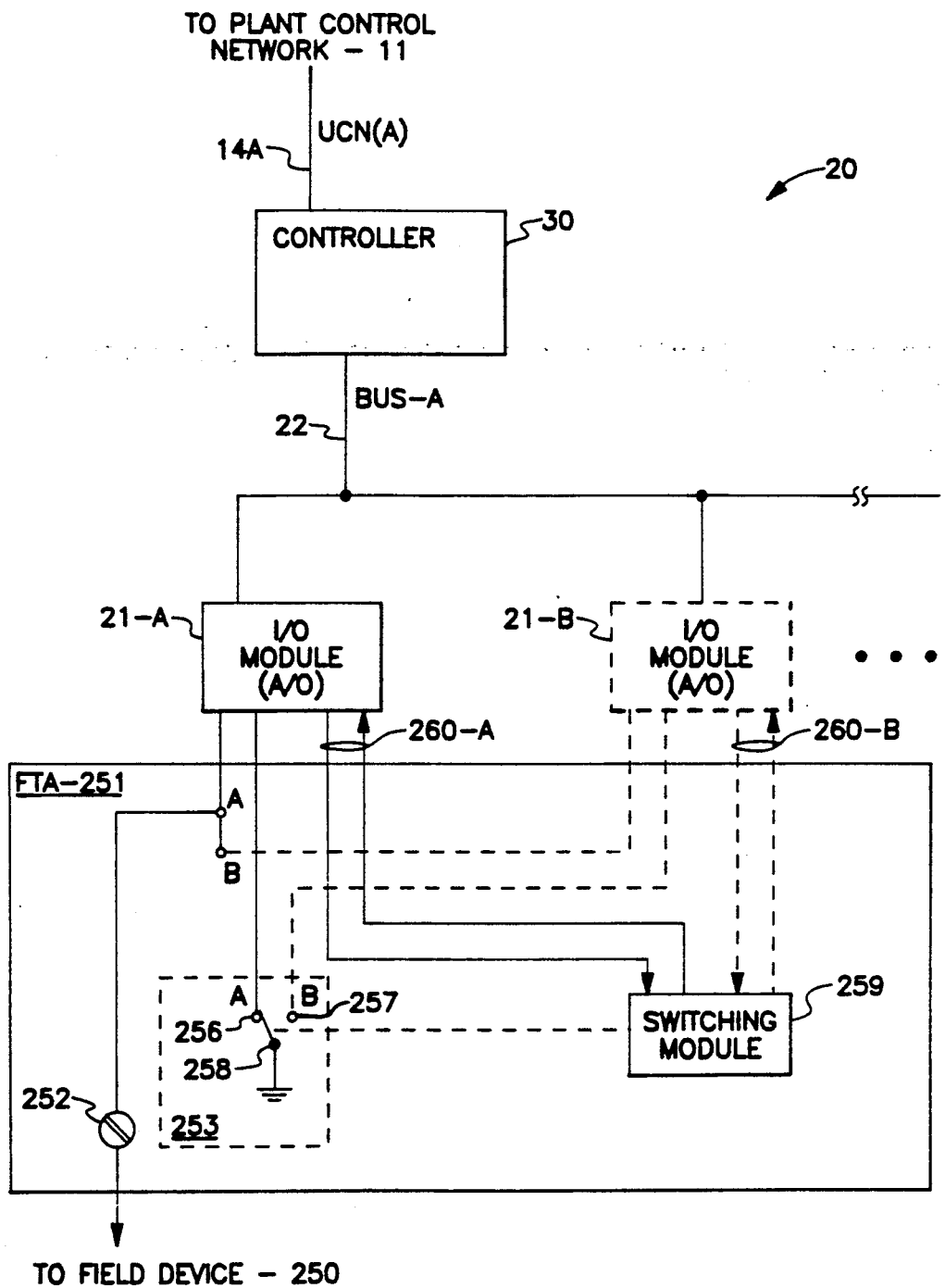
FIG. 6 shows a simplified block diagram of the process controller of FIG. 2.

The IOP redundancy of the present invention will now be described. Referring to FIG. 6, there is shown a simplified block diagram of the process controller of FIG. 2, having the redundancy of the controller omitted, and having an IOP and a backup IOP, only, for purposes of example. In the preferred embodiment, up to forty (40) IOPs can be included, and any mix of IOP types can be included in a redundant or non-redundant configuration. As will be recognized by those skilled in the art from the description above, the controller 30 performs as the master processor, the IOP module 21-A as the slave processor, and the IOP module 21-B as the backup (or redundant) slave processor.

For example purposes only, assume that the process controller 20 has controller 30 operating as the primary controller and I/O module 21-A (an analog output module) configured as module 1 in accordance with configuration rules of the process control system. IOP A 21-A is always present (assuming the requirement for an A/O IOP) and IOP B 21-B is optional (and initially assumes it is not configured. Thus IOP B is shown in dotted lines in FIG. 6.) For example purposes, assume IOP(A) is placed in file address 3 and card address 8. (In the preferred embodiment of the system, the cabinet is divided in files (rows) and card slots.) Thus in this example the "printed circuit card" of an A/O IOP which is designated as IOP(A) 21-A is inserted in row 3, card slot 8. IOP(A) is given a logical address and assume that in this example is assigned logical address number 1. The controller 30 data base includes the data for an IOP connected to BUS-A 22 logical address 1, physical address of IOP(A) of file 3, card 8, and is initially non-redundant. (See State 1 of Table 1.) The controller 30 communicates to the slave IOP via the configured logical address. The process control system 10 is powered up and initialized along with the process controller 20, including controller 30 and IOP(A) 21-A, and running normally. IOP(A) 21-A is connected to the "A" points of FTA 251. At some later time, the backup slave IOP 21-B can be added while the system 10 is running. IOP(A) 21-A continues to run normally and IOP(B) 21-B is configured in any spare location in the file (cabinet, row, ...). IOP(B) is connected to the "B" terminals of FTA 251, and in accordance with the configuration rules of the system, information is outputted (from the universal station US 122 of the plant control network 11) relating to the IOP(B), including the location information and the fact that IOP(B) is the backup to module 1 (i.e., the module having logical address 1). That information is transmitted to controller 30 during normal operations of the system 10 and the controller data base is updated (reference state 2 of Table 1, assume IOP(B) 21-B has been located in file 4, card slot 10). It will be recognized by those skilled in the art the many techniques are available for the manual inputting of such information from an operators input terminal and will not be discussed further herein since it is not necessary for understanding the redundancy scheme of the present invention. The controller 30 then acts to synchronize the IOP(B) 21-B. Synchronizing is the process whereby the same data base is contained in both IOP(A) 21A and IOP(B) 21-B. The information of the data base of IOP(A) is requested by the controller 30 and then transferred to IOP(B) 21-B thereby causing the data base of IOP(B) 21-B to be the same, whereupon IOP(B) is commanded to start executing. IOP(B) performs the same operations as IOP(A) and outputs the same information to the FTA 251 at essentially the same time (each IOP is operating off its own clock). It will be recognized that IOP(B) 21-B is a dedicated backup. The operation of FTA 251, however, permits the data from only IOP(A) or IOP(B) to reach the field device 250, as described above. Once IOP(B) is synchronized, the controller data base is updated as shown in state 3 of Table 1. In normal operation, all transfers (i.e., writes) to the IOP(A) 21-A from controller 30 are also received by IOP(B). IOP(B) eavesdrops on the communications since both IOP(A) and IOP(B) have a logical address of 1 in this example and the controller 30 communicates to the IOPs by logical address. In this manner, synchronization of IOP(B) is maintained, no extra communications are necessary and hence no extra communications time is taken, and there is no impact on the "non-redundant" layers of software. Also, from the above description, redundancy can be achieved while the system 10 is operating normally (i.e., add redundancy "on-the-fly".)

TABLE 1

| CONTROLLER 30 DATA BASE | | State 1 Initial, Non-Redundant | State 2 Initial Redundant | State 3 Normal Redundant | State 4 Failover |
|---|---|---|---|---|---|
| Logical Address | | 1 | 1 | 1 | 1 |
| Physical Address A | File (rack, row, ...) | 3 | 3 | 3 | 3 |
| | Card (slot within file) | 8 | 8 | 8 | 8 |
| Physical Address B | File | 0 | 4 | 4 | 4 |
| | Card | 0 | 10 | 10 | 10 |
| Redundant (Yes or No) | | N | Y | Y | Y |
| Synchronized (Yes or No) | | N | N | Y | N |
| Primary (A or B) | | A | A | A | B |

When an error is detected, it is desired that IOP(A) no longer communicate to the field devices 250, and that IOP(B) pick up communications essentially immediately. This switching is referred to as failover. (Failures can be detected by internal microprocessors failing self-tests, parity errors, watch-dog times timing out, .... Failures can also be directed by the controller in detecting a condition undetected by the primary IOP.) It is desirable that the failover be transparent to the system, i.e., to all non-redundant layers of software. Control lines A (CONTA) 260-A are connected from IOP(A) 21-A to switching module 259, and control lines B (CONTB) 260-B are connected from IOP(B) 21-B to switching module 260. The switching module 260 controls the arm 258 of relay 253. The switching module 259 includes logic which detects and responds to control signals on control lines 260-A, 260-B and causes the relay 253 to switch to the "B" terminals. Since IOP(B) is executing the same as IOP(A) had been before the failure of IOP(A), IOP(B) continues to operate and output to the "B" terminal 256, but after the switching of relay 253, the output from IOP(B) is now coupled to the field devices 250. The controller 30 is assured of polling IOP(A) every 500 ms to ascertain that the primary is still operational, but also can detect failover on the next message intended for the pair. Upon detecting that IOP(A) has failed and that the switching (i.e., failover) has occurred, the controller data base is updated to indicate IOP(B) is primary, as shown in state 4 of Table 1. The controller 30 also awards IOP(B) the logical address 1 (in this example) such that when data is requested by controller from logical address 1, IOP(B) 21-B will respond. In the preferred embodiment of the system, IOP(A) and IOP(B) do not initiate communications with the controller 30, but respond to requests for information. Finally, the message upon which the controller detected failover is re-issued to the new primary (now IOP(B)) so that no messages are lost. During the failover, all other messages are serially queued in a FIFO to assure the intended order from the controller.

In normal operation, the controller 30 is issuing read requests to logic address 1 (IOP(A) 21-A) based on requests from other controllers 30, plant control network 11, .... These requests are queued up by IOP(A) and the controller 30 also keeps track of pending requests in the requested order. When an acknowledgment of a request is not received by the controller 30 (in the preferred embodiment retries are attempted), the controller determines from the controller data base that there is a backup and is synchronized (state 3 of Table 1). Read requests are made to IOP(A) using physical addresses, and in this scenario, does not respond since IOP(A) has failed. A read request is made to IOP(B) 21-B using the physical address, and acknowledges and responds to the request. The controller 30 receives information from the IOP(B) that it has accomplished failover (as a result of the information transmitted and received from the control lines B 260-B to the switching module 259), and also verifies that IOP(B) is synchronized. The controller 30 then awards IOP(B) 21-B the logical address of 1, i.e., acknowledges IOP(B) as the primary, (in this example) and updates the controller data base (state 4 of Table 1). The redundant information still indicates a Y (yes) in state 4 since this is configuration data. The dynamic data indicates that IOP(B) is the primary and that the synchronized information (relating to the backup IOP, now IOP(A)) indicates "No". The read requests which were queued up by IOP(A) and not yet processed is known to the controller 30. The controller 30, then initiates to IOP(B) those read requests queued up at the time the failure of IOP(A) was detected. Thus, no communications (requests from other subsystems of system 10) go unanswered.

In the preferred embodiment of the system 10, the above described process takes a very short amount of time, approximately 50 ms so the impact to control is unaffected. The control software issues read and writes requests normally every 250 ms in the preferred embodiment. The process just described is the "redundant layer" of the software. The control (i.e., the "non-redundant portion of the controller software") does nothing different because of the failover or the redundancy. Thus, the redundancy software is transparent to the system 10. Further, although only the A/O type IOP is described, it will be understood by those skilled in the art that any type IOP can be utilized in the method thus described. It will be recognized by those skilled in the art, that although only a single slave IOP and a corresponding slave IOP have been discussed, the relay 253 of FTA 251 can include a multiple set of contact points 256,257 operating from a single coil 254 (or switching module 259), thereby permitting each slave IOP to communicate with a plurality of devices 250 which also provides the backup capability to the plurality of devices.

While there has been shown what is considered the preferred embodiment of the present invention, it will be manifest that many changes and modifications can be made therein without departing from the essential spirit and scope of the invention. It is intended, therefore, in the annexed claims, to cover all such changes and modifications which fall within the true scope of the invention.

We claim:

1. In a control system, having a control network for controlling a process, said control network interfacing with a controller, the controller having a slave input-/output processor (IOP) connected thereto for communication with at least one device of a predetermined type, the predetermined types including analog input, analog output, digital input, and digital output, the slave IOP executing a predetermined task and having a data base associated therewith, said controller also having a backup slave IOP connected thereto of the same type as the slave IOP, the slave IOP being operatively connected to said device and operating as a primary IOP to said device, a method for providing backup to the slave IOP by the backup slave IOP comprising the steps of:

a) loading the backup slave IOP with the same data base and the same predetermined task as the slave IOP;

b) causing the backup slave IOP to execute essentially in parallel to the slave IOP;

c) eavesdropping to all communications from the controller to the slave IOP by the backup slave IOP, such that:
   i) when a write command is communicated to the slave IOP, updating the backup slave IOP data base by the backup slave processor; otherwise
   ii) ignoring the communication to the slave IOP;

d) ignoring communications from the slave IOP to the controller by the backup slave IOP, the updating of the backup slave IOP data base being performed by the backup slave IOP as a result of the execution of the same predetermined task on the same data base by the backup slave IOP, thereby maintaining the data base of the backup slave IOP the same as the data base of the slave IOP;

e) upon detecting a fault by either of said slave IOP or said backup slave IOP, communicating the detection of said fault to the other IOP;

f) failing over by said IOPs whereby said backup slave IOP is operatively connected to said device and said slave IOP is operatively disconnected from the device; and g) acknowledging by the controller that the backup slave IOP is now operating as a primary source to the device, wherein the failing over from the primary IOP to the backup slave IOP occurs without any loss of communication within the control system.

2. A method for providing backup to the slave IOP according to claim 1 wherein the step of failing over is transparent to the control system.

3. A method for providing backup to the slave IOP according to claim 1 wherein the step of loading the backup slave IOP is performed while the system is running.

4. A method for providing backup to the slave IOP according to claim 3 wherein the backup slave IOP is a dedicated backup to the slave IOP thereby providing a 1:1 backup.

5. A method for providing backup to the slave IOP according to claim 1 wherein the backup slave IOP is executing the same program on the same data essentially simultaneously with the slave IOP.

6. In a control system, having a control network for controlling a process, said control network interfacing with at least one controller, each controller having at least one slave input/output processor (IOP) connected thereto for communicating with at least one device of a predetermined type, the predetermined types including analog input, analog output, digital input, and digital output, each slave IOP executing a predetermined task and having a data base associated therewith, each controller also having at least one backup slave IOP connected thereto of the same type as the corresponding slave IOP, each backup slave IOP being dedicated to a predetermined corresponding slave IOP, each slave IOP operating as a primary IOP, a method for providing backup to each slave IOP by the corresponding backup slave IOP comprising the steps of:

a) loading each backup slave IOP with the same data base and the same predetermined task as the corresponding slave IOP;

b) causing the backup slave IOP to execute essentially in parallel to the corresponding slave IOP;

c) eavesdropping to all communications from the controller to the slave IOP by the corresponding backup slave IOP, such that:

i) when a write command is communicated to the slave IOP, updating the corresponding backup slave IOP data base by the corresponding backup slave processor; otherwise ii) ignoring the communication to the slave IOP;

d) ignoring communications from the slave IOP to the controller by the corresponding backup slave IOP, the updating of the corresponding backup slave IOP data base being performed by the corresponding backup slave IOP as a result of the execution of the same predetermined task on the same data base by the corresponding backup slave IOP, thereby maintaining the data base of the backup slave IOP the same as the data base of the corresponding slave IOP;

e) upon detecting a fault by either of said slave IOP or said corresponding backup slave IOP, communicating the detection of said fault to the other IOP;

f) failing over by said IOPs whereby said corresponding backup slave IOP is operatively connected to said device and said slave IOP is operatively disconnected from the device; and g) acknowledging by the controller that the corresponding backup slave IOP is now operating as a primary source to the device, wherein the failing over from the primary IOP to the corresponding backup slave IOP occurs without any loss of communication to the control system.

7. A method for providing backup to the slave IOP according to claim 6 wherein the step of failing over is transparent to the control system.

8. A method for providing backup to the slave IOP according to claim 7 wherein the step of loading the backup slave IOP is performed while the system is running.

9. A method for providing backup to the slave IOP according to claim 6 wherein a first predetermined number of slave IOPs, each being of a predetermined type are operatively connected to the controller, and wherein a second predetermined number of backup slave IOPs are also operatively connected to said controller, such that for each slave IOP desirous of having a backup has a corresponding backup slave IOP of the same type.

10. A method for providing backup to the slave IOP according to claim 6 wherein each backup slave IOP is executing the same program on the same data essentially simultaneously with the corresponding slave IOP thereby providing a 1:1 redundancy scheme and permitting failover to occur transparent to the control system and without any loss of communications within the control system.

* * * * *